(12) United States Patent
Amemiya

(10) Patent No.: US 6,310,607 B1
(45) Date of Patent: Oct. 30, 2001

(54) MOUSE DEVICE

(75) Inventor: Kunio Amemiya, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 0 days.

(21) Appl. No.: 09/313,376

(22) Filed: May 18, 1999

(30) Foreign Application Priority Data

May 21, 1998 (JP) .................................................. 10-139809

(51) Int. Cl.$^7$ ...................................................... G09G 5/08
(52) U.S. Cl. ............................................ 345/163; 345/159
(58) Field of Search ................................... 345/160–167, 345/156, 157, 159; 273/148 B

(56) References Cited

U.S. PATENT DOCUMENTS

| | | | |
|---|---|---|---|
| 5,122,785 | * | 6/1992 | Cooper .................................. 345/163 |
| 5,633,657 | * | 5/1997 | Falcon .................................. 345/163 |

FOREIGN PATENT DOCUMENTS

| | | |
|---|---|---|
| 60-256832 | 12/1985 | (JP) . |
| 64-1021 | 1/1989 | (JP) . |

\* cited by examiner

*Primary Examiner*—Regina Liang
(74) *Attorney, Agent, or Firm*—Staas Halsey LLP

(57) ABSTRACT

A mouse device is provided. This mouse device includes a movement detector, a button push detector, a control unit, and a timing unit. The movement detector detects movement of the mouse in the directions of X and Y axes, and the button push detector detects a button push. Based on the detection results, the control unit generates movement information and button push information, and sets a movement detection interval time at a predetermined value in accordance with the movement information and the button push information. The timing unit sets movement detection timing based on the movement detection interval time. The mouse device sends the movement information and the button push information to an information processing device.

4 Claims, 6 Drawing Sheets

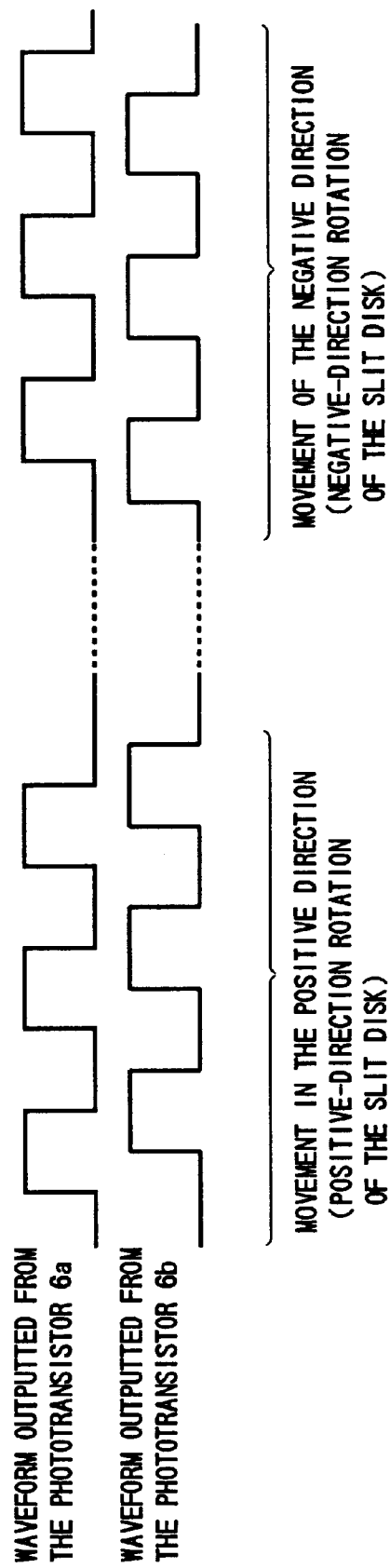

MOUSE DEVICE

BACKGROUND OF THE INVENTION

1. Field of the Invention

The present invention generally relates to a mouse device belonging to an information processing device such as a personal computer, a work station, or a word processor.

2. Description of the Related Art

In recent years, the operation systems in information processing devices, such as personal computers, work stations, and word processors, have been rapidly improved so that anyone can easily operate these devices. Because of this trend, easy-to-operate mouse devices are becoming more and more common than keyboards which have been mainstream devices to input information.

Easy-to-operate mobile and portable information processing devices are often used in a vehicle or outdoors. The recent development of wireless mouse devices and wireless keyboards allows more freedom in the usage environment of information processing devices, such as personal computers, work stations, or word processors.

However, these information processing devices or mouse devices and keyboards carry batteries inside, and each battery has only a limited service life. Therefore, there has been a demand for low power consuming devices which have longer service lives.

A conventional mouse device includes a movement detector which detects movement in the directions of X and Y axes, and a button push detector which detects a button push. Based on the detection information from both detectors, a control unit generates movement information and button push information, and sends the information to an information processing unit. The movement information contains information on the travel distance of the mouse device and information on whether the mouse device is being moved or stopped. The button push information contains information on whether each button is pushed.

FIG. 1 is a flowchart of the procedures carried out by the control unit. The following is a description of the procedures. It should be noted here that the following description concerns a wireless mouse device, but it also applies to other types of mouse devices. In FIG. 1, the steps shown above the dot-and-dash line are the subroutine of an operation state, and the steps below the line are the subroutine of an idle state. In the idle state, the buttons are off, and the mouse device is stopped. In the operation state, one of the buttons is pushed, or the mouse device is being moved, or one of the buttons is pushed while the mouse device is being moved.

When the conventional mouse device is turned on, the control unit sets a movement detection interval time at an initial value T1'. In other words, the timer in the mouse device is set at the initial value T1' (S101). In the conventional mouse device, the movement detection interval time is T1' in the operation state and T3' in the idle state, and the relationship between T1' and T3' is T1'<T3'.

The control unit confirms the detection information from the button push detector (S102), and then judges whether the predetermined movement detection interval time T1' has passed (S103). If T1' has not yet passed (S103 NO), the control unit unit generates the button push information based on the confirmed detection information, and sends only the button push information to the information processing device (S105). Here, the control unit has not yet confirmed the movement information from the movement detector (S106: NO), i.e., the movement detection interval time T1' has not yet passed. Therefore, the control unit repeatedly sends only the latest button push information to the information processing device until the time T1' has passed (S102) (S103: NO) (S105) (S106: NO).

When the movement detection interval time T1' has passed (S103: YES), the control unit confirms detection information from the movement detector (S104), generates the movement information based on the detection information, and sends the movement information as well as the latest button push information to the information processing device (S105).

The control unit then judges whether the mouse device is in the idle state or in the operation state (S106). If the mouse device is in the operation state (S106: NO), i.e., if one of the buttons is pushed, and/or the mouse device is being moved, the control unit repeats steps S102 to S106 until the mouse device is put in the idle state (S106: YES) where the buttons are off and the mouse device is stopped. While repeating the subroutine, the control unit generates the movement information and the button push information and sends the information to the information processing device every movement detection interval time T1'.

If the mouse device is in the idle state (S106: YES), the control unit sets the movement detection interval time at T3' (S107), and confirms the detection information from the button push detector (S108). If the buttons are off (S109: NO), the control unit judges whether the movement detection interval time T3' has passed (S110). If the movement detection interval time T3' has not yet passed (S110: NO), the control unit repeatedly confirms the detection information from the button push detector until the movement detection interval time T3' has passed (S108) (S109: NO) (S110: NO).

When the movement detection interval time T3' has passed (S110: YES), the control unit judges whether the mouse device is being moved based on the detection information from the movement detector (S111). If the mouse device is stopped (S112: NO), the control unit maintains the idle state (S106: YES), and repeats steps S108 to S112 until one of the buttons is pushed (S109: YES) and/or the mouse device is being moved (S112: YES).

When one of the buttons is pushed (S109: YES) and/or the mouse device is being moved (S112: YES), the control unit moves on to the operation subroutine and sets the movement detection interval time in the timer at T1'. The control unit then repeats steps S102 to S106 until the mouse device is put in the idle state (S106: YES).

As described so far, the conventional mouse device operates with low power consumption in the idle state (movement detection interval time T3').

With the conventional mouse device, however, a button push detected regardless of the movement detection interval time is considered as an operation state, and the movement detection interval time is set shorter than in the idle state. In such a case, the power consumption cannot be reduced, and the batteries carried in the information processing device or the mouse device have only short lives.

SUMMARY OF THE INVENTION

A general object of the present invention is to provide a mouse device which consumes only a small amount of electric power both in the idle state and the operation state.

The object of the present invention is achieved by a mouse device which includes a movement detector, a button push detector, a control unit, and a timing unit. The movement detector detects movement in the directions of X and Y axes. The button push detector detects a button push. The control unit generates movement information and button push information based on the detection information from the movement detector and the button push detector, and sets a movement detection interval time at a predetermined value based on the detection information from the movement detector. The timing unit sets timing for detecting movement in accordance with the predetermined value set in the control unit. The mouse device transmits the movement information and the button push information to an information processing unit.

Since the control unit sets the movement detection interval time at the predetermined value based on the detection information from the movement detector only when the mouse device is being moved, the mouse device of the present invention can also operate with low power consumption in the operation state (when one of the buttons is pushed).

The above and other objects and features of the present invention will become more apparent from the following description taken in conjunction with the accompanying drawings.

BRIEF DESCRIPTION OF THE DRAWINGS

FIG. 3 shows waveforms outputted from the mouse device of the present invention;

DESCRIPTION OF THE PREFERRED EMBODIMENTS

The following is a description of a mouse device of one embodiment of the present invention, with reference to the accompanying drawings.

Figure 1:
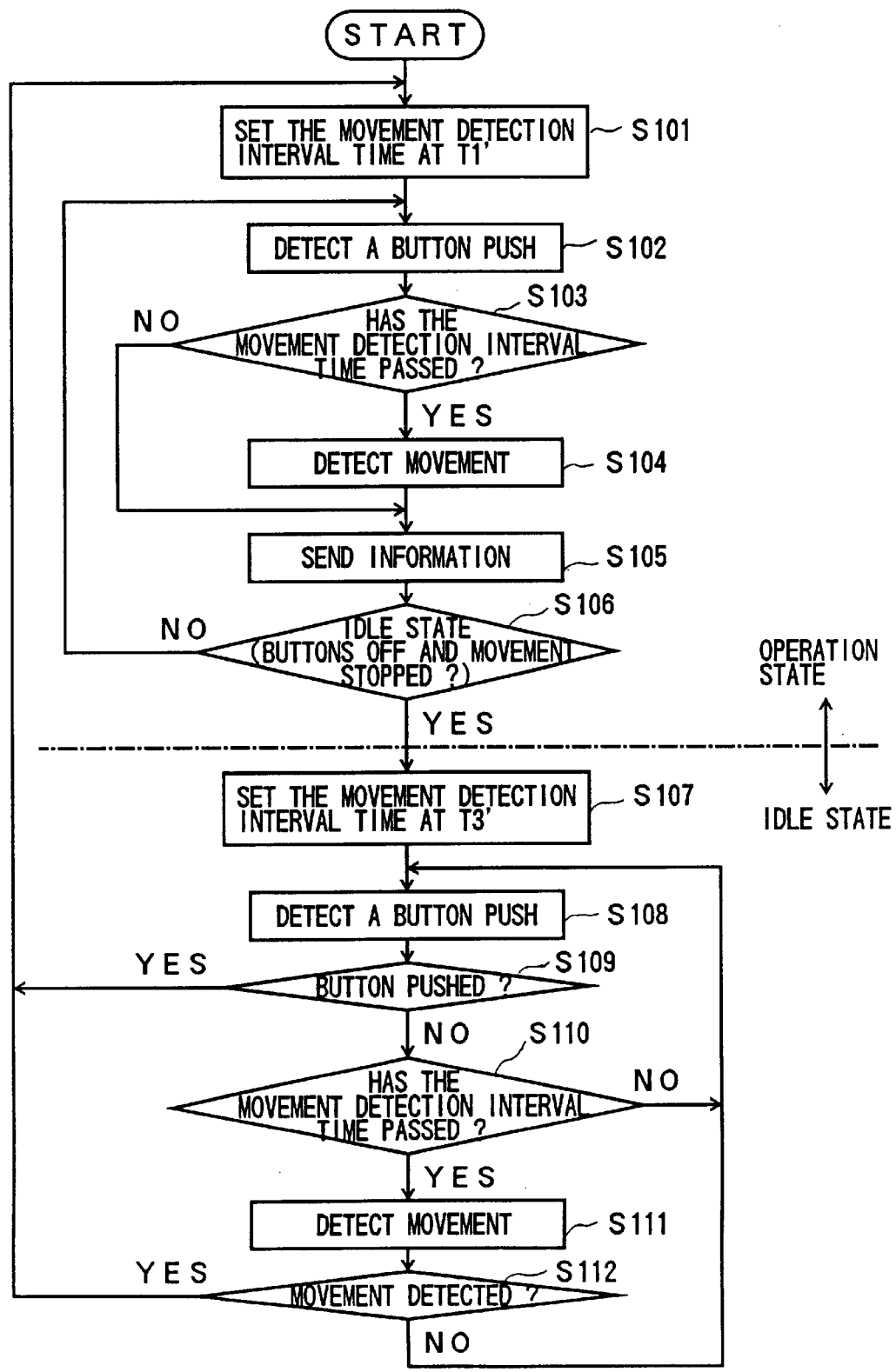
FIG. 1 is a flowchart of the procedures carried out by the control unit of a conventional mouse device.
Figure 2A:
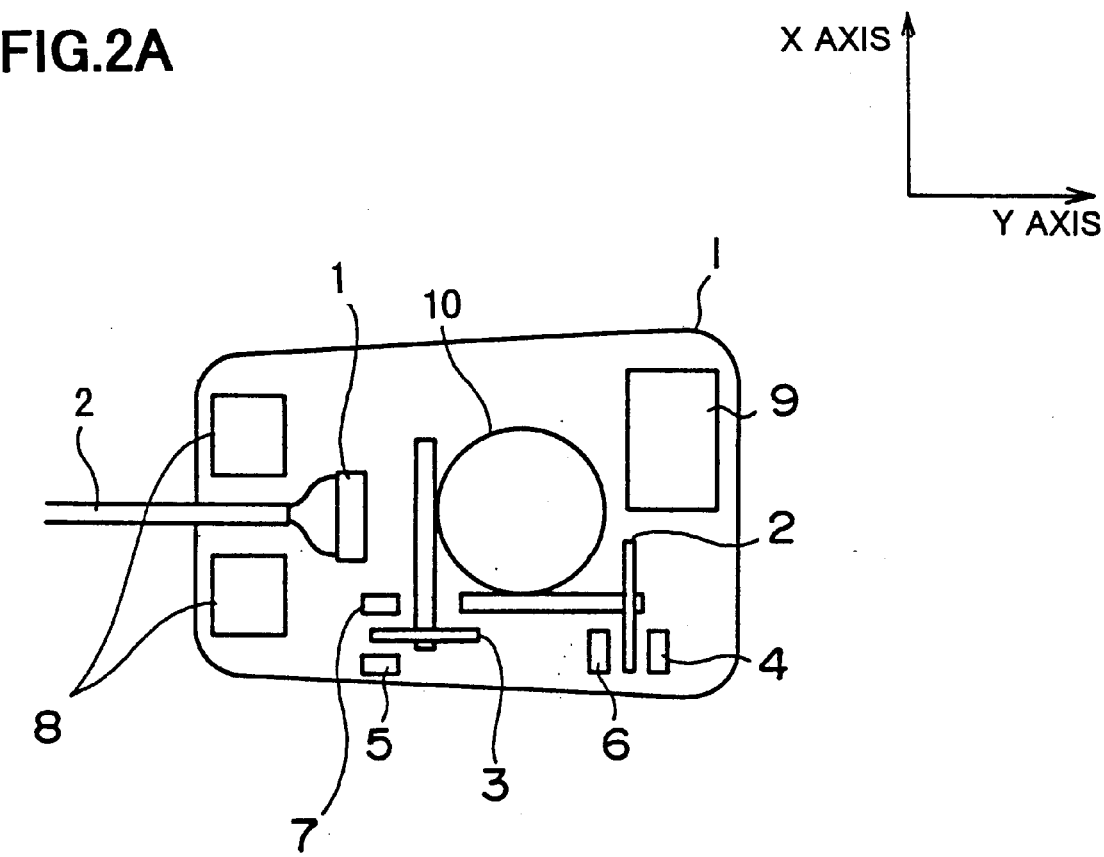
FIGS. 2A and 2B are schematic views of a mouse device of one embodiment of the present invention.
Figure 2B:
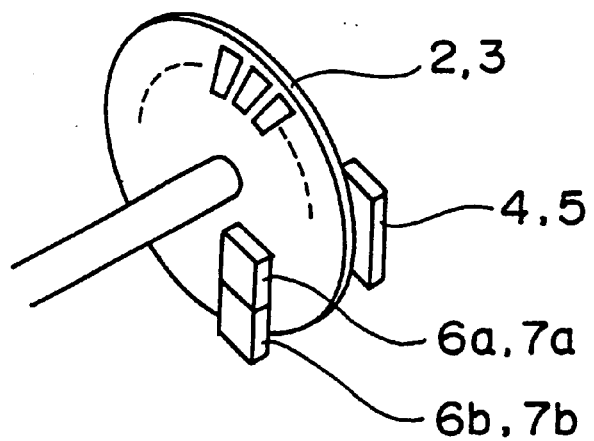

FIGS. 2A and 2B illustrate the structure of the mouse device of this embodiment.

The mouse device 1 of this embodiment comprises a slit disk 2, an LED 4, a phototransistor 6, a slit disk 3, an LED 5, a phototransistor 7, a ball 10, a push button switch 8, and an electronic device 9 including a microcomputer. The slit disk 2, the LED 4, and the phototransistor 6 are used to generate X-axis direction movement information. The slit disk 3, the LED 5, and the phototransistor 7 are used to generate Y-axis direction movement information. The ball 10, the push button switch 8, and the electronic device 9 are used to transfer movement of the mouse device 1 to the slit disks 2 and 3. When a user pushes the push button switch 8 and moves the mouse device, the microcomputer generates button push information and movement information, and sends the information to an information processing unit. The mouse device 1 shown in FIG. 2 has a communication channel made up of a connector and a cable. The mouse device 1 sends the information and receives electric power via the communication channel. The mouse device 1 of this embodiment can be of a wireless type. In such a case, an LED is provided on the edge of the mouse device, and the LED is switched on and off to generate optical pulses and transmit the information. The mouse device is driven by a battery contained in the mouse device.

The phototransistors 6 and 7 include phototransistors 6a and 6b in the direction of the X axis, and phototransistors 7a and 7b in the direction of the Y axis, as shown in FIG. 2B. Each of the phototransistors generates a waveform independently.

When the user moves the mouse device 1 in a desired direction, the output waveforms in the direction of the X axis, i.e., the output waveforms of the phototransistors 6a and 6b, are shifted in phase from each other by ¼, as shown in FIG. 3. The phase shift is caused by rotation of the slit disk 2. The phase shift direction in a positive direction of the X axis is opposite to the phase shift direction in a negative direction of the X axis. The microcomputer judges from the phase shift whether the mouse device is moved in the positive direction or negative direction. When the user moves the mouse device 1 in a desired direction, the output waveforms in the direction of the Y axis are also outputted from the phototransistors 7a and 7b. The microcomputer judges the desired direction from the output waveforms in both directions of the X and Y axes.

Figure 4:
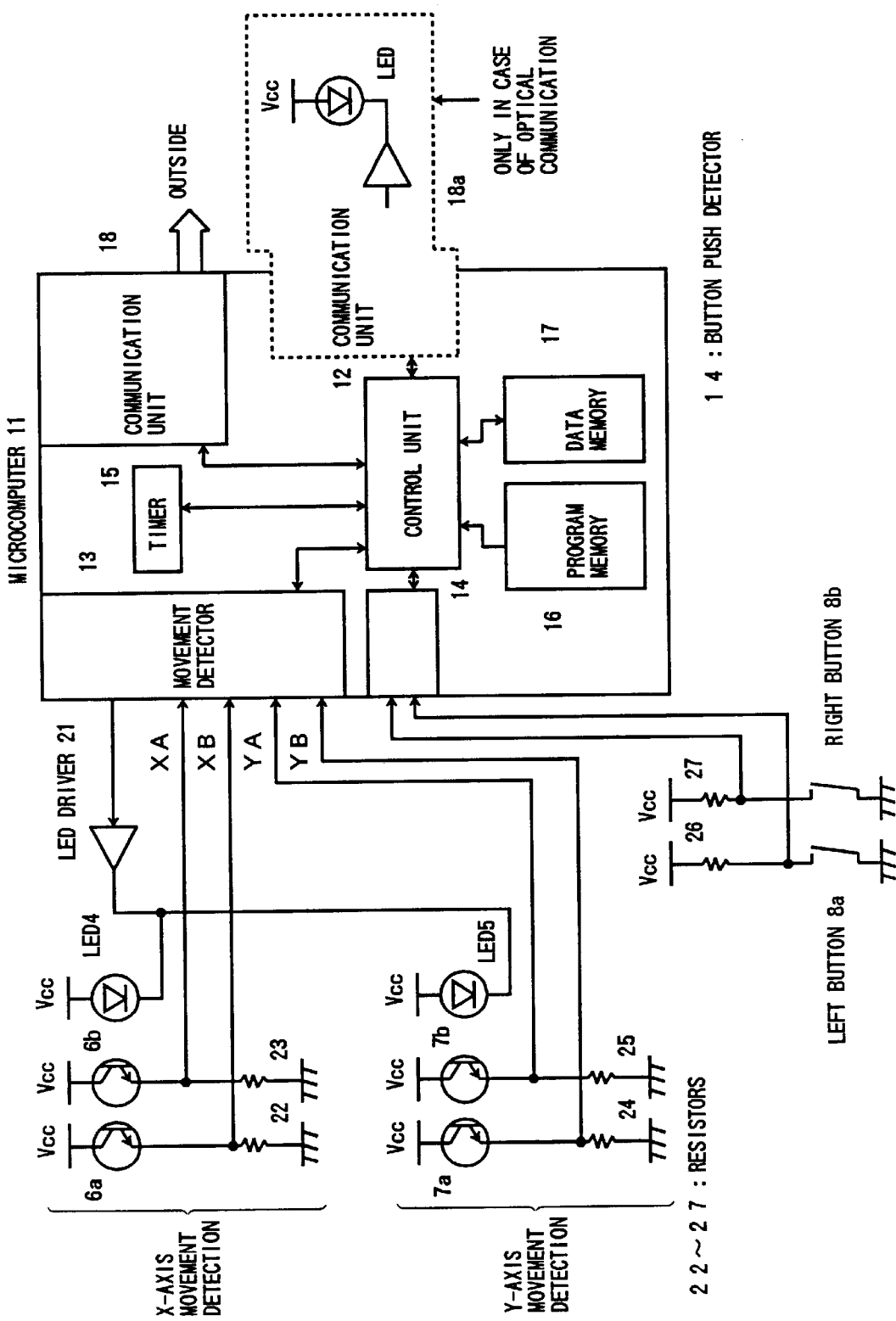
FIG. 4 is a block diagram of the mouse device of the present invention.

FIG. 4 is a block diagram of the electronic device 9 inside the mouse device shown in FIG. 2 and a circuit connected to the electronic device 9.

The electronic device 9 of this embodiment comprises the microcomputer 11, an LED driver 21, and resistors 22 to 27.

The microcomputer 11 is connected to the phototransistors 6a and 6b, the phototransistors 7a and 7b, a left button 8a, a right button 8b, and the LED driver 21 for driving the LEDs 4 and 5.

When the LEDs 4 and 5 are switched on by the microcomputer 11, an optical signal from the LED 4 is transmitted to the phototransistors 6a and 6b via the slits of the slit disk 2. The optical signal is then converted into movement detection signals XA and XB (which are converted into pulse signals by rotation of the slit disk 2 while the mouse device is being moved) by the phototransistors 6a and 6b, and then transmitted to the microcomputer 11. Likewise, an optical signal from the LED 5 is converted into movement detection signals YA and YB at the phototransistors 7a and 7b, and then transmitted to the microcomputer 11. When the left button 8a or the right button 8b is pushed, a button push signal is transmitted to the microcomputer 11. Resistors 22 to 25 are pull-down resistors for stabilizing the level of each of the movement detection signals (XA, XB, YA, YB) when the respective phototransistors are off. Resistors 26 and 27 are pull-up resistors for stabilizing the level of each of the button push signals when the respective buttons are off.

Referring to FIG. 4, the microcomputer 11 comprises a movement detector 13, a button push detector 14, a control unit 12, a timer 15, a data memory 17, a program memory 16, and a communication unit 18. If the mouse device is of a wireless type, a communication unit 18a shown in FIG. 4, instead of the communication unit 18, is mounted to the electronic device 9.

The movement detector 13 detects the movement detection signals XA and XB, and YA and YB.

The button push detector 14 detects each of the button push signals.

The control unit 12 generates movement information and button push information based on the detection signals transmitted from the movement detector 13 and the button push detector 14. The control unit 12 also sets a movement detection interval time at a predetermined value based on the movement detection signals from the movement detector 13. Here, the movement information includes information on a travel distance of the moving mouse device and information on whether the mouse device is stopped.

The timer 15 generates timing signals for detecting the movement detection signals XA and XB, and YA and YB, in accordance with the detection intervals set by the control unit 12.

The data memory 17 stores the detection signals transmitted from the movement detector 13 and the button push detector 14.

The program memory 16 stores a program to be executed by the control unit 16.

The communication unit 18 sends the movement detection information and the button push information generated by the control unit 12 to an information processing unit.

Figure 5:
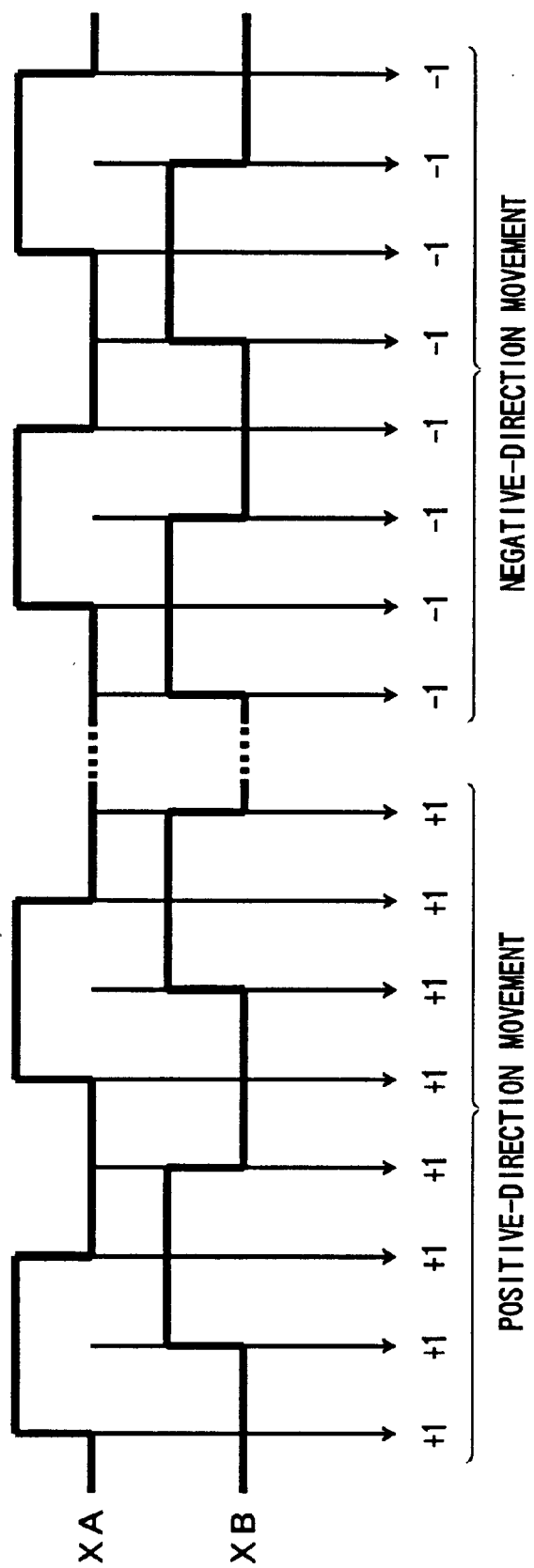
FIG. 5 shows output waveforms.

FIG. 5 illustrates the movement detection signals XA and XB, and YA and YB, all of which are transmitted from the movement detector 13.

As shown in FIG. 5, when the mouse device 1 is moved in a positive direction of the X axis, the movement detection signals XA and XB change as: (L, L)→(H, L)→(H, H)→(L, H)→(L, L)→(H, L) →(H, H)→(L, H)→(L, L). Here, the control unit 12 receives the movement detection signals XA and XB from the movement detector 13, and counts up by +1 every time there is a change in the signals. In FIG. 5, the control unit 12 adds +8 as a new count value to a previously accumulated count value. When the mouse device 1 is moved in a negative direction of the X axis, the movement detection signals XA and XB change as: (L, L)→(L, H)→(H, H)→(H, L)→(L, L)→(L, H)→(H, H)→(H, L)→(L, L). Here, the control unit 12 receives the movement detection signals XA and XB from the movement detector 13, and counts up by −1 every time there is a change in the signals. In FIG. 5, the control unit 12 adds −8 as a new count value to the previously accumulated count value.

Count values are accumulated, and the control unit 12 sends the accumulated count value as the movement information to an information processing unit via the communication unit 18 at uniform intervals, for instance, every 30 milliseconds. After sending the movement information to the information processing unit, the control unit 12 clears the count value, and resumes accumulating count values.

The signal processing by the control unit 12 described above also applies in a case where the mouse device 1 is moved in a positive direction and a negative direction of the Y axis. If the mouse device 1 is moved in a positive or negative direction of the X axis and a positive or negative direction of the Y axis at the same time, i.e., if the mouse device 1 is moved diagonally, the control unit 12 counts up in both directions and sends both counts values as the movement information to the information processing unit.

Figure 6:
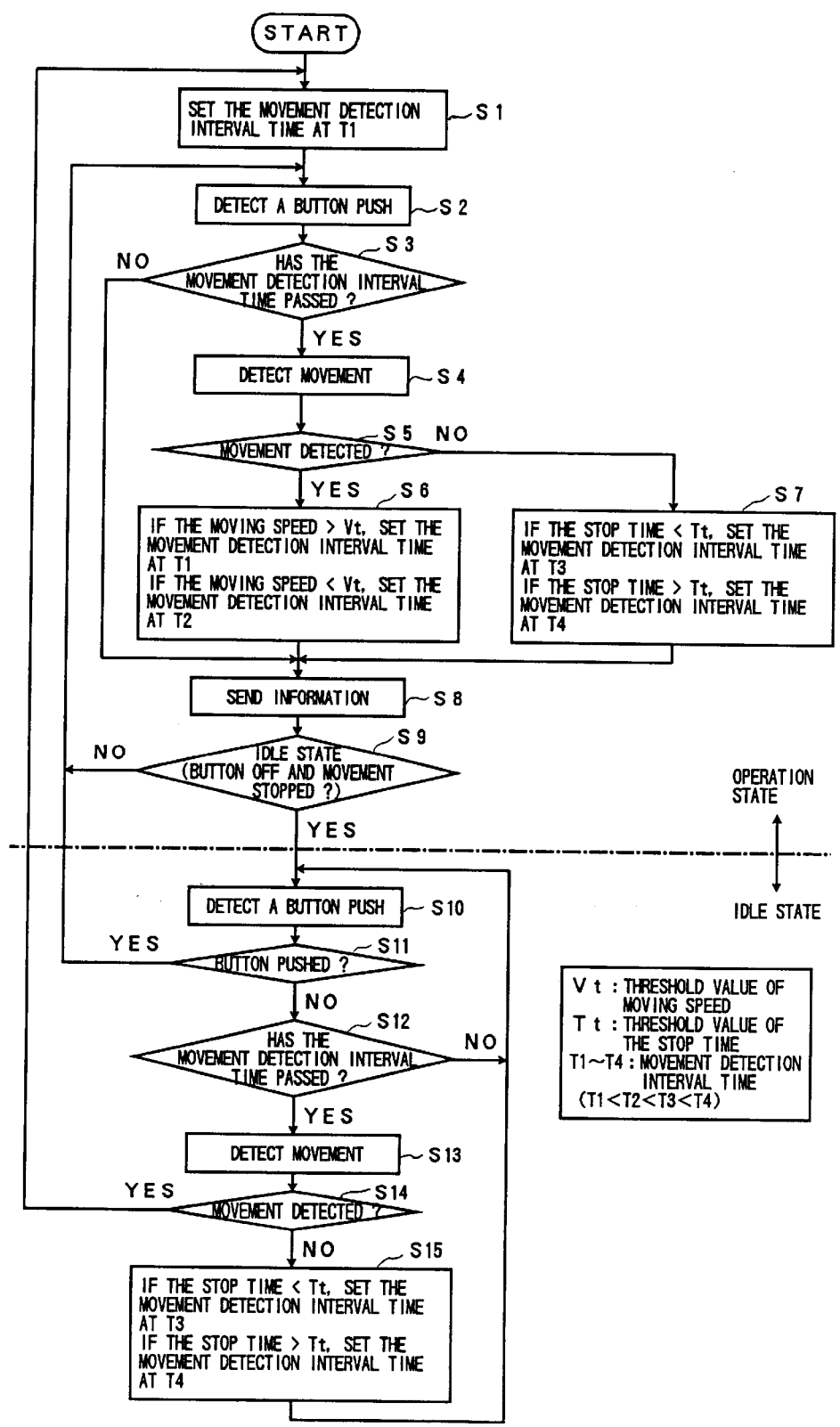
FIG. 6 is a flowchart of the procedures carried out by the control unit of the mouse device of the present invention.

FIG. 6 is a flowchart of the procedures carried out by the control unit 12. The program of the procedures is stored in the program memory 16, and read out and executed by the control unit 12. Although the mouse device 1 of this embodiment shown in FIG. 2 is used in this flowchart, other types of mouse devices can be used. The flowchart shows a subroutine of the operation state above the dot-and-dash line, and a subroutine of the idle state below the dot-and-dash line. The idle state refers to a state of the mouse device 1 during a release of the buttons and a stop of the mouse device 1. The operation state refers to a state during a push of a button, during a move of the mouse device 1, or during a push of a button and a move of the mouse device 1.

When the mouse device 1 is turned on, the control unit 12 sets the intervals, at which the movement detector 13 detects movement of the mouse device 1, at an initial value T1. In other words, the timer 15 in the mouse device 1 is set at the initial value T1 (S1). In the mouse device 1, the movement detection interval time has four stages, including T1 and T2 (in the operation state), and T3 and T4 (in the idle state). The relationship among the movement detection interval time values are expressed as: T1<T2<T3<T4. Although the movement detection interval time has the four stages for ease of explanation, the number of stages is not limited to four.

After the control unit 12 recognizes a button push signal from the button push detector 14, the signal is stored in the data memory 17 (S2). The control unit 12 then judges whether the movement detection interval time T1 has passed (S3). If the interval time T1 has not passed (S3: NO), the control unit 12 generates button push information based on the stored button push signal, and sends only the button push information to the information processing unit via the communication unit 18 (S8). Here, the control unit 12 has not received movement detection signals XA, XB, YA, and YB. In other words, the movement detection interval time T1 has not passed yet. Therefore, only the latest button push information is repeatedly sent to the information processing unit until the interval time T1 has passed (S2) (S3: NO) (S8) (S9: NO).

When the movement detection interval time T1 has passed (S3: YES), the control unit 12 receives the movement detection signals XA, XB, YA, and YB from the movement detector 13, and generates movement information based on the detection signals (S4). The movement information is stored in the data memory 17.

If the mouse device 1 is being moved (S5: YES), the control unit 12 judges whether the moving speed of the mouse device 1 is higher or lower than a predetermined threshold value Vt. If the moving speed is higher than the threshold value Vt, the timer 15 is maintained at the movement detection interval time T1. If the moving speed is lower than the threshold value Vt, the timer 15 is set at the movement detection interval time T2 (S6). Here, the threshold value Vt is a given value determined in advance. If the movement detection interval time becomes progressively longer as the moving speed of the mouse device 1 is to become lower, the movement detection interval time is not limited to the two stages of T1 and T2. For instance, a plurality of threshold values can be employed, and the movement detection interval time can have several stages.

After step S6, the control unit 12 sends the stored movement information as well as the latest button push information to the information processing unit (S8). Instead of step S8, the movement information can be accumulated and sent to the information processing unit at uniform intervals.

If the mouse device 1 is stopped (S5: NO), the control unit 12 judges whether the elapsed time since the stop of the mouse device 1 exceeds a predetermined threshold value Tt. If the elapsed time does not exceed the threshold value Tt, the timer 15 is set at the movement detection interval time T3. If the elapsed time exceeds the threshold value Tt, the timer 15 is set at the movement detection interval time T4 (S7). Here, the threshold value Tt is a given value determined in advance. If the movement detection interval time is to progressively become longer as the elapsed time after the stop becomes longer, the movement detection interval time is not limited to the two-stages of T3 and T4. For instance, a plurality of threshold values can be employed, and the movement detection interval time can have several stages.

After step S7, the control unit 12 sends the stored movement information as well as the latest button push information to the information processing unit (S8). Instead of step S8, the movement information can be accumulated and sent to the information processing unit at uniform intervals.

After step S8, the control unit 12 judges whether the mouse device 1 is in the idle state or in the operation state (S9). If the mouse device 1 is in the operation state (S9: NO), i.e., if one of the buttons is pushed, and/or the mouse device 1 is being moved, the control unit 12 repeats the subroutine of step S2 to step S9 until the mouse device 1 is in the idle state (S9: YES), i.e., until the buttons are off and the mouse device 1 is stopped. Here, the control unit 12 generates the current movement information and button push information every time the movement detection interval time T1, T2, T3, or T4 has passed. The control unit 12 then sends the information to the information processing unit. Instead of step S8, the movement information can be accumulated and sent to the information processing unit at uniform intervals.

If the mouse device 1 is in the idle state (S9: YES), the control unit 12 confirms a button push signal from the button push detector 14, and stores the signal in the data memory 17 (S10). Here, the movement detection interval time in the timer 15 should be set at T3 or T4, because the setting in step S7 is invariably carried out in the idle state.

If the buttons are off (S11: NO), the control unit 12 judges whether the movement detection interval time T3 or T4 has passed (S12). If the movement detection interval time has not passed yet (S12: NO), the control unit 12 repeatedly receives a button push signal from the button push detector 14 until the movement detection interval time T3 or T4 has passed, and stores the button push signals in the data memory 17 (S10) (S11: NO) (S12: NO).

When the movement detection interval time T3 or T4 has passed (S12: YES), the control unit 12 receives the movement detection signals XA, XB, YA, and YB, and then generates movement information based on the detection signals. The movement information generated is stored in the data memory 17.

If the mouse device 1 is stopped in step S13 (S14: NO), the control unit 12 maintains the idle state (S9: YES). If the movement detection interval time is set at T3 at this point, the control unit 12 judges whether the time elapsed since the stop of the mouse device 1 exceeds the predetermined threshold value Tt. If the elapsed time does not exceed the threshold value Tt, the timer 15 is maintained at T3. If the elapsed time exceeds the threshold value Tt, the timer 15 is set at T4 (S15).

The control unit 12 repeats the subroutine of step S10 to step S15 until the mouse device 1 is put in the operation state, where one of the buttons is pushed (S11: YES) and/or the mouse device 1 is being moved (S14: YES).

If one of the buttons is on (S11: YES), the control unit 12 goes back to step S2 to move on to the subroutine of the operation state while the movement detection interval time in the timer 15 is maintained at T3 or T4. If the mouse device 1 is being moved (S14: YES), the control unit 12 moves onto the subroutine of the operation state, and sets the movement detection interval time in the timer 15 at T1 (S1). The control unit 12 then repeats step S2 to step S9 until the mouse device 1 is put in the idle state (S9: YES).

The mouse device 1 of this embodiment closely changes the movement detection interval time both in the idle state and operation state, thereby making the power consumption smaller than that of a conventional mouse device.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The present application is based on Japanese priority application No. 10-139809, filed on May 21, 1998, the entire contents of which are hereby incorporated by reference.

What is claimed is:

1. A mouse device, comprising:
   a movement detector which detects movement of the mouse device in directions of an X axis and a Y axis;
   a button push detector which detects a button push;
   a control unit which generates movement information and button push information based on detected information from the movement detector and the button push detector, and sets a movement detection interval time at a predetermined value based on detected information from the movement detector, the control unit setting the predetermined value so that the movement detection interval time becomes longer as a moving speed of the mouse device being moved becomes lower; and
   a timing unit which sets timing for detecting movement in accordance with the predetermined value set by the control unit, the mouse device transmitting the movement information and the button push information to an information processing unit.

2. A mouse device, comprising:
   a movement detector which detects movement of the mouse device in directions of an X axis and a Y axis;
   a button push detector which detects a button push;
   a control unit which generates movement information and button push information based on detected information from the movement detector and the button push detector, and sets a movement detection interval time at a predetermined value based on detected information from the movement detector, the control unit judging whether the moving speed of the mouse device being moved is higher or lower than a threshold value and setting the predetermined value so that the movement detection interval time during low-speed movement is longer than the movement detection interval time during high-speed movement; and
   a timing unit which sets timing for detecting movement in accordance with the predetermined value set by the control unit, the mouse device transmitting the movement information and the button push information to an information processing unit.

3. A mouse device, comprising:
   a movement detector which detects movement of the mouse device in directions of an X axis and a Y axis;
   a button push detector which detects a button push;
   a control unit which generates movement information and button push information based on detected information from the movement detector and the button push detector, and sets a movement detection interval time at a predetermined value based on detected information from the movement detector, the control unit setting the predetermined value so that the movement detection interval time becomes longer as an elapsed time since a stop of the mouse device becomes longer; and
   a timing unit which sets timing for detecting movement in accordance with the predetermined value set by the control unit, the mouse device transmitting the movement information and the button push information to an information processing unit.

4. A mouse device, comprising:

a movement detector which detects movement of the mouse device in directions of an X axis and a Y axis;

a button push detector which detects a button push;

a control unit which generates movement information and button push information based on detected information from the movement detector and the button push detector, and sets a movement detection interval time at a predetermined value based on detected information from the movement detector, the control unit judging whether an elapsed time since a stop of the mouse device exceeds a threshold value and setting the predetermined value so that the movement detection interval time after the elapsed time exceeds the threshold value is longer than the movement detection interval time before the elapsed time exceeds the threshold value; and a timing unit which sets timing for detecting movement in accordance with the predetermined value set by the control unit, the mouse device transmitting the movement information and the button push information to an information processing unit.

* * * * *